United States Patent [19]

Wen

[11] Patent Number: 4,734,675

[45] Date of Patent: Mar. 29, 1988

[54] COLLISION AVOIDANCE SIGNAL

[76] Inventor: Jack Wen, 5F, 87 Sung Chiang Rd., Taipei 10428, Taiwan

[21] Appl. No.: 895,178

[22] Filed: Aug. 11, 1986

[51] Int. Cl.⁴ .............................................. B60Q 1/44
[52] U.S. Cl. ...................................... 340/71; 340/119; 362/61; 248/161
[58] Field of Search ........................ 340/71, 72, 87, 97, 340/119, 138, 84, 92, 146; 362/61, 80, 419, 427, 430; 248/161, 423, 419

[56] References Cited

U.S. PATENT DOCUMENTS

| | | | |
|---|---|---|---|
| 3,128,448 | 4/1964 | Schumer et al. | 340/87 |
| 4,210,841 | 7/1980 | Vodicka et al. | 362/267 X |
| 4,280,173 | 7/1981 | Bradley et al. | 362/294 |
| 4,449,167 | 5/1984 | Cohen | 340/87 X |
| 4,555,748 | 11/1985 | Bradley | 362/61 |
| 4,575,782 | 3/1986 | Levine et al. | 362/61 |
| 4,600,913 | 7/1986 | Caine | 340/97 X |
| 4,602,320 | 7/1986 | Tomkin et al. | 362/80 |
| 4,654,757 | 3/1987 | Birkhauser | 362/61 |

FOREIGN PATENT DOCUMENTS 236964  3/1945  Switzerland ......................... 248/161

Primary Examiner—Charles A. Ruehl
Assistant Examiner—Brian R. Tumm
Attorney, Agent, or Firm—Adrian Calderone

[57] ABSTRACT

An adjustable collision avoidance signal for automobiles comprising a brake indicator signal, a mounting bracket, and a pedestal. Horizontal detents in the mounting bracket and complemental notches in the pedestal allow the mounting bracket to adjust vertically. The brake indicator signal is horizontally movable and pivotable with respect to the mounting bracket to which it is fixed. A light shade prevents stray reflections. The internal light source is located at the focal point of a parabolic reflector.

3 Claims, 3 Drawing Figures

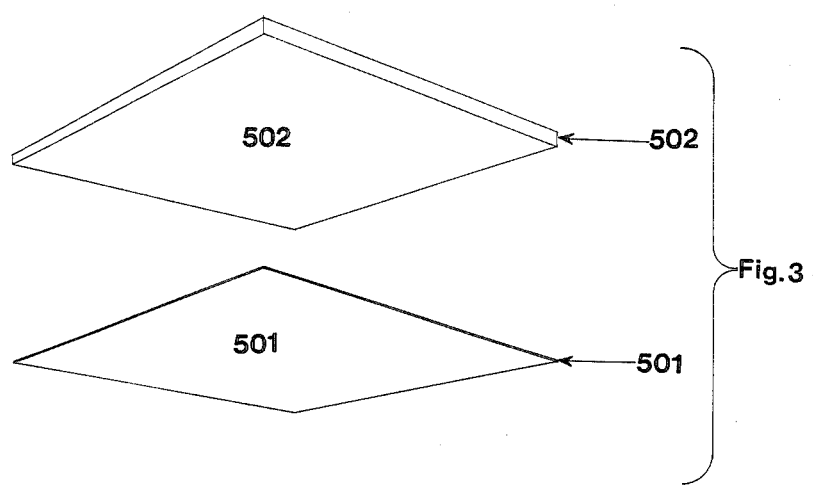

COLLISION AVOIDANCE SIGNAL

BACKGROUND

1. Field of Invention

This invention relates to signal lights. Specifically, it relates to brake indicator lights which are mountable in the rear interior of an automobile to warn following motorists that the vehicle's brakes are being operated.

2. Description of Prior Art

Heretofore, automobile brake lights have been located in the rear of the tail section of vehicles. Typically, their position is far below the eye level of the following motorists. The standard brake lights are visible to the motorist immediately following a car, but subsequent motorists following in a line usually cannot see the brake lights of vehicles two or more cars ahead.

At the relatively high speeds of highway travel a dangerous situation occurs when a vehicle is forced to brake suddenly and only the immediately following motorist can see the brake lights of the braking vehicle. A fraction of a second of reaction time must elapse before the following motorist applies his brakes. This interval of time is multiplied by each successive motorist in the line. At highway speeds this often results in a multiple car pile up: an entire line of vehicles collide, each car slamming into the car in front of it.

To avoid such collisions the United States government has issued regulatory standards requiring new cars to have a brake indicator signal light either internally or externally mounted midway across the width of the vehicle at the level of the rear windshield. This position is not only more visible to the motorist immediately following a car by being closer to eye level, but may also be seen by successive motorists through the front and rear windshields of preceding cars.

Older model cars do not have such brake indicator signals and the present invention is designed to facilitate the installment of such indicators in the interior of the older model cars. This collision avoidance signal is fully adjustable and fits almost any type or model of sedan car.

Adjustability is achieved through a cooperatively indexed mounting bracket and pedestal, which allows for vertical adjustment. Additionally, the top section, a brake indicator signal, is horizontally adjustable and pivotable with respect to the mounting bracket. Furthermore, the light shade may be cut to fit against the inside surface of any type of rear windshield.

OBJECTS AND ADVANTAGES

Accordingly, one object of this invention is to provide a collision avoidance signal which meets U.S. safety standards.

Another object of this invention is to provide a collision avoidance signal which is mountable in the interior of almost any type of sedan car.

Another object of this invention is to provide a collision avoidance signal which is fully adjustable.

Another object of this inention is to provide an economical collision avoidance signal which easily mounts into a vehicle and is easily used by the consumer.

Readers will find further objects and advantages of this invention from consideration of the ensuring description and the accompanying drawings.

DRAWING FIGURES

FIG. 3 shows an exploded view of the heat shield.

Figure 1:
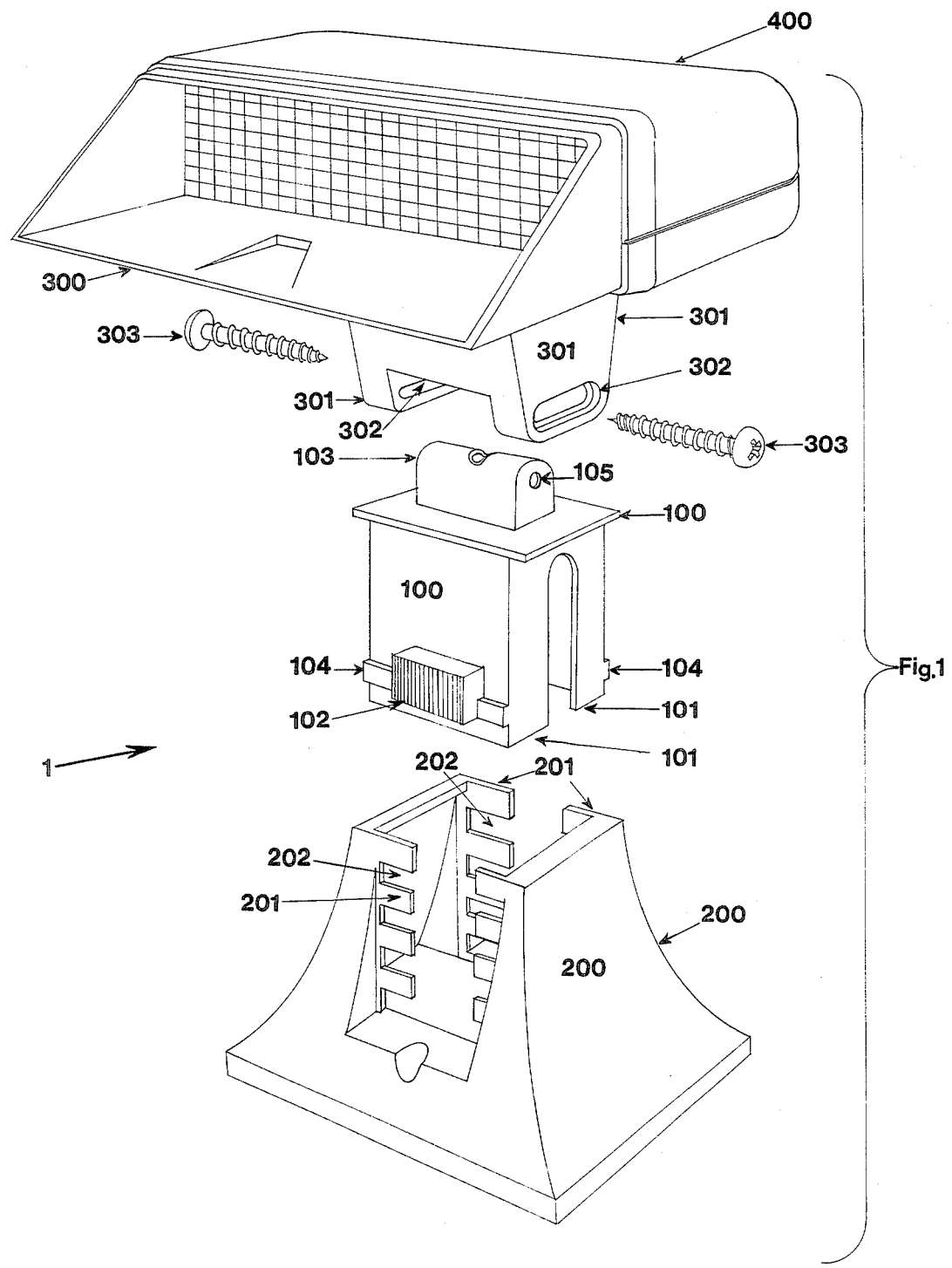
FIG. 1 shows an exploded view of the collision avoidance signal.
Figure 2:
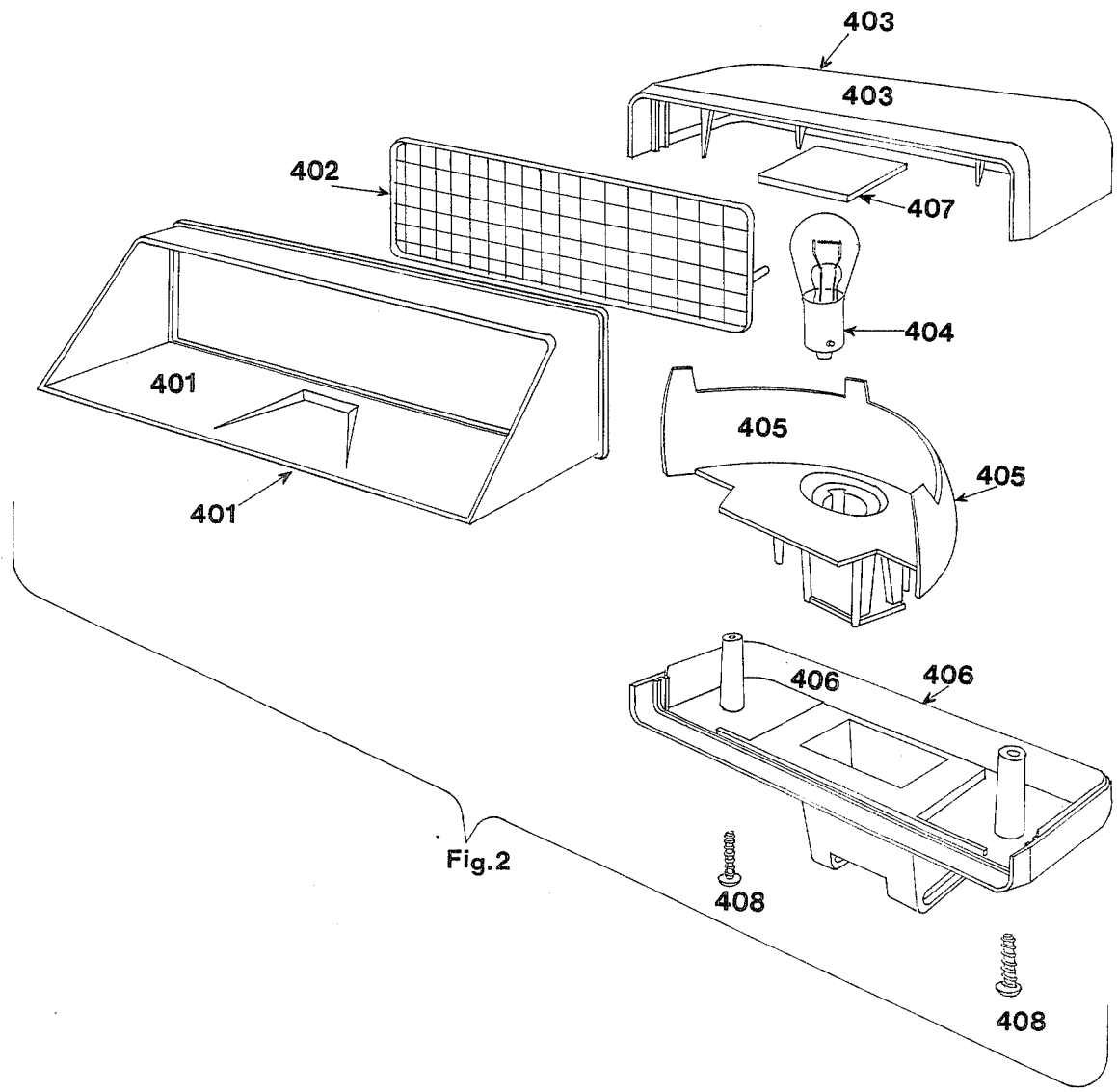
FIG. 2 shows an exploded view of the brake indicator signal.

Nomenclature List
1 generally refers to collision avoidance signal
100 mounting bracket
101 support foot
102 finger pad
103 convex projection
104 horizontal detent
105 tapped hole
200 pedestal
201 tooth
202 horizontal notch
300 brake indicator signal
301 depending side
302 horizontal slot
303 screw fastener
400 housing
401 light shade
402 translucent face plate
403 hood
404 light source
405 parabolic reflector
406 body of brake indicator signal
407 heat shield
408 screw fastener
501 thermal reflector foil
502 thermal insulating layer

DESCRIPTION

FIG. 1 shows the collision avoidance signal 1 according to its preferred embodiment. The collision avoidance signal comprises a top section, which is the brake indicator signal 300, a mounting bracket 100, and a pedestal 200. The pedestal 200 and the mounting bracket 100 have a cooperating indexing means for vertical disposition of the mounting bracket 100 relative to the pedestal 200. The mounting bracket 100 has horizontal detents 104, projecting finger pads 102, a convex projection 103, and front and rear support feet 101 to which the horizontal detents 104 and finger pads 102 are attached on opposite, outwardly facing front and rear sides. The detents 104 engage and are received in complemental horizontal notches 202 in pedestal 200. The downwardly projecting support feet 101 are made of a resilient material. The preferred method of manufacture is to mold the entire mounting bracket 100 as a single piece from a suitable polymeric resin. When finger pressure is applied to the finger pads 102, the support feet 101 are compressed inwardly. The mounting bracket 100 may then be inserted into the pedestal 200 and vertically positioned to the desired height. When finger pressure is released the resilient support feet 101 expand outwardly to their original position and the horizontal detents 104 engage the horizontal notches 202 in the pedestal 200 thereby fixing the mounting bracket 100 in the pedestal 200 at the desired height. The distance between the front and rear support feet 101 should be less than four inches so as to allow the user of this invention to reach around it with one hand, using the thumb and forefinger of the same hand in pressing the finger pads 102 and inserting the mounting bracket 100 in the pedestal 200.

The pedestal 200, like the mounting bracket 100, may be molded as a single piece from a polymeric resin. The pedestal has opposing series of horizontal teeth 201, the teeth being positioned so as to form a vertical series of horizontal notches 202. These notches 202 are for engaging and receiving the horizontal detents 104 of the mounting bracket 100. The opposing series of teeth 201 are spaced apart so as to allow the finger pads 102 to project outwardly beyond the teeth 201 and to be able to slide vertically between the opposing series of teeth 201. There are two opposing series of teeth 201 for the front of the pedestal 200 and two opposing series of teeth 201 for the rear of the pedestal 200. The dimensions are such as to allow the front and rear support feet 101 of the mounting bracket 100 to slide vertically between the front and rear series of teeth 201.

The brake indicator signal 300 has two depending sides 301, and horizontal slots 302. Screw fasteners 303 are inserted via the horizontal slots 302 and engage the tapped holes 105 in the vertical end surfaces of the convex projection 103. When the screw fasteners 303 are loosened the brake indicator signal 300 may be moved backwards or forwards relative to the mounting bracket 100. It may also be pivoted. When the screw fasteners 303 are tightened the brake indicator signal 300 will not move.

The brake indicator signal 300 has an interior light source 404 which is responsive to the braking of an automobile by means of a wire connection to the car's electrical circuits. The light source 404 is positioned in the interior of a housing 400. The housing 400 has two parts: the body 406, and the hood 403. The body 406 and the hood 403 are removably attached to each other by means of screw fasteners 408 thereby allowing the user to disassemble the housing 400 for replacement of parts, maintenance, or repair. A parabolic light reflector 405 is situated so that the light source 404 is at the focal point of the reflector 405. Light striking the concave parabolic surface of the reflector 405 is reflected as parallel rays outwardly through the translucent face plate 402. The parabolic reflector 405 diminishes dispersion of light and increases the visibility of the signal at greater distances. The translucent face plate 402 extends across the open front of the housing 400. Typically, it is tinted red as a warning to following motorists to stop.

The light shade 401 is composed of a soft, flexible, opaque material such as a black rubber. It extends outwardly from the edge of the open front of the housing 400 perpendicular to the plane of the translucent face plate 402. The light shade 401 is meant to press against the inside surface of the rear windshield in order to prevent stray reflections from the brake indicator signal 300 from disturbing the the driver's rear vision. In the preferred embodiment of this invention lines are marked on the rubber light shade 401. The user cuts the shade along the appropriate lines to match the slope and shape of the inside surface of his rear windshield.

The heat shield 407 is used to protect the housing 400 from heat generated by the light source 404. The heat shield 407 comprises a layer of thermal insulation 502 bonded to a layer of thermal reflecting material 501. The thermal insulator 502 may be a cellular heat resistant polymer. The heat reflecting material may be aluminum foil. The heat shield 407 is approximately one inch square and 1/16 inches thick. It is best mounted by means of an adhesive to the interior surface of the hood 403 and positioned above the light source 404 with the heat reflecting surface 501 facing the light source 404 and the thermal insulation layer 502 attached to the inside surface of the hood 403.

While the above description contains many specifics, the reader should not construe these as limitations on the scope of the invention, but merely as exemplifications of the preferred embodiment thereof. Those skilled in the art may envision other possible variations that are within its scope. For example, it is possible to support the indicator signal 300 on the mounting bracket 100 with only one depending side 301, horizontal slot 302, screw fastener 303, and tapped hole 105. The indicator signal may be used for purposes other than a brake indicator. Also, various other materials of construction may be used as well as plastics. Accordingly, the scope of the invention should not be determined by the preferred embodiments, but by the appended claims and their legal equivalents.

I claim:

1. A collision avoidance signal for vehicles comprising,
    (a) a pedestal;
    (b) a mounting bracket having a top surface, and front and rear resilient support feet fixedly attached to the top surface and downwardly projecting therefrom, said front and rear resilient support feet being movable towards each other in response to an externally applied pressure and then returnable to their original position when the externally applied pressure is released;
    (c) a cooperating indexing means for vertical positioning of the mounting bracket relative to the pedestal wherein said cooperating indexing means comprises at least one horizontal detent attached to each support foot of the mounting bracket, and a plurality of horizontal notches forming teeth attached to the pedestal and disposed as a front pair and a rear pair of opposing vertical rows of horizontal teeth, said opposing pairs of vertical rows of horizontal teeth being spaced apart so as to admit external pressure to the support feet of the mounting bracket, said front and rear pair of vertical rows of horizontal teeth being spaced apart so as to admit the front and rear support feet of the mounting bracket between them, and said horizontal notches being capable of engaging and receiving the horizontal detents of the support feet when externally applied pressure is released;
    (d) an indicator signal;
    (e) a means for attaching the indicator signal to the mounting bracket so that it is both horizontally movable and pivotable with respect to the mounting bracket.

2. The collision avoidance signal of claim 1 wherein the means for attaching the indicator signal to the mounting bracket comprises,
    (a) at least one depending side attached to the indicator signal, said side having an elongated horizontal slot;
    (b) an elongated convex projection attached to the top surface of the mounting bracket and having at least one vertical end surface;
    (c) at least one screw fastener disposed through said elongated horizontal slot and removably attachable to the vertical end surface of the elongated convex projection.

3. The collision avoidance signal of claim 2 wherein the indicator signal is responsive to the operation of the brakes of a vehicle.

* * * * *